United States Patent
Deng et al.

(10) Patent No.: US 6,947,871 B2
(45) Date of Patent: Sep. 20, 2005

(54) YIELD/QUALITY IMPROVEMENT USING CALCULATED FAILURE RATE DERIVED FROM MULTIPLE COMPONENT LEVEL PARAMETERS

(75) Inventors: Youping Deng, Sunnyvale, CA (US); Christopher D. Keener, San Jose, CA (US); Jinsong Wang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 20 days.

(21) Appl. No.: 10/678,031

(22) Filed: Sep. 30, 2003

(65) Prior Publication Data

US 2005/0071103 A1 Mar. 31, 2005

(51) Int. Cl.$^7$ .......................... G06F 11/30; G21C 17/00
(52) U.S. Cl. ...................................... 702/182
(58) Field of Search ................ 702/33–35, 81, 702/84, 117–121, 179–185; 714/33, 47, 48

(56) References Cited

U.S. PATENT DOCUMENTS

| | | | |
|---|---|---|---|
| 4,766,595 A | * 8/1988 | Gollomp | 714/33 |
| 4,841,456 A | 6/1989 | Hogan, Jr. et al. | 364/550 |
| 5,903,460 A | 5/1999 | Syouji et al. | 364/468.24 |
| 5,978,751 A | 11/1999 | Pence et al. | 702/179 |
| 6,546,355 B2 | 4/2003 | Matsushita | 702/152 |
| 6,574,754 B1 | 6/2003 | Smith | 714/47 |
| 2003/0120445 A1 | 6/2003 | Barbour et al. | 702/81 |
| 2003/0120457 A1 | 6/2003 | Singh et al. | 702/181 |

FOREIGN PATENT DOCUMENTS

| | | |
|---|---|---|
| JP | 4283647 | 10/1992 |
| JP | 7198553 | 8/1995 |
| JP | 2001291218 | 10/2001 |
| JP | 200210015 | 4/2002 |
| JP | 2002319258 | 10/2002 |
| JP | 2003006809 | 1/2003 |

OTHER PUBLICATIONS

Predicting Defects in Disk Drive Manufacturing: A Case Study in High–Dimensional Classification, C. Apte, S.M. Weiss, and g. Groul, IEEE Annual Conference on AI Applications, CAIA–93, Mar. 1993.

* cited by examiner

*Primary Examiner*—Michael Nghiem
(74) *Attorney, Agent, or Firm*—Larry B. Guernsey; Intellectual Property Law Offices

(57) ABSTRACT

A method for improving yields in manufacturing processes includes identifying parameters which affect performance at a subsequent step in the process, collecting data concerning individual performance parameters, creating a reference scale which correlates individual parameters with probability of failure at a subsequent step in the process, testing a manufactured unit to collect performance data concerning two or more of the individual parameters from a manufactured unit, comparing performance data concerning two or more of the individual parameters from the manufactured unit to the reference scale to assign probability of failure for each of the single performance parameters, calculating a Figure of Merit, and utilizing the Figure of Merit to sort or disposition units.

22 Claims, 6 Drawing Sheets

YIELD/QUALITY IMPROVEMENT USING CALCULATED FAILURE RATE DERIVED FROM MULTIPLE COMPONENT LEVEL PARAMETERS

BACKGROUND OF THE INVENTION

1. Field of the Invention

The present invention relates generally to testing and evaluation of electrical or magnetic devices, and more particularly to methods of increasing yield and quality of devices by considering multiple performance parameters.

2. Description of the Prior Art

Electronic components such as integrated circuits and disk drive heads often fail due to flaws or marginal performance resulting from variability in the manufacturing process. Components are shipped or incorporated into larger assemblies. Certain qualities of these components influence the performance of the completed assembly.

In the semiconductor field, to minimize failures in the field, manufacturers routinely test components to screen out defects and ensure quality levels shipped to the consumer. A certain quantity of parts shipped or incorporated into larger assemblies will eventually fail to function after running in a use condition for some period of time, due to "reliability defects" which are not apparent until after the parts have been used for some period of time. It has become common practice to use an acceleration technique called "burn in" as part of their production test procedures. Burn-in generally consists of exposing the part to extremes of voltage and temperature, in order to screen out many reliability defects in their products before shipping the parts to the consumer, with the expectation that a lower quantity of reliability failures will occur.

In order to reduce the time and expense of component burn-in, "binning" systems have been developed, by which components are separated into separate bins based on certain criteria that reflect on the expected reliability of the components. For example, it has been discovered that the likelihood of a component that passes a particular type of testing having a latent defect increases with the number of neighboring components that fail this same type of testing. By "binning" those components that pass this particular testing into separate groups depending on how many of its neighbors failed this same testing, the components are separated into groups expected to have greater or lesser degrees of early life reliability.

In the disk drive industry, heads may be built into several models of hard disk drives, each with different relative sensitivities of soft error rate (SER) to various parameters measured to characterize the heads. Heads can be segregated and used in the model in which their SER is likely to be best. This segregation is referred to as binning. Heads which are very likely to produce poor SER in the disk drive may be scrapped at component level, saving the expense of further processing and assembly.

As there are multiple factors that can be observed as the criteria for the binning process, the process can become very complex, with multiple parameters to be considered. As it is important that potentially defective components be screened out, it is also important that marginal components be evaluated in a manner which does not exclude too many which may in practice turn out to be acceptably reliable. As an example, a disk drive read head may have, among other qualities, the qualities of 1) amplitude, meaning the amplitude of the signal it is capable of producing in a uniform quasi-static magnetic field, and 2) recession, meaning the relative amount of distance that the head is positioned relative to the data medium that it is reading. In prior art binning systems, components may be screened for each of these parameters, perhaps given a rating from 1–10 on the scale of the qualities. There may be a cut-off point established for acceptability, so that, for instance, for amplitude, a relative value of 5 is required, so that a component with a rating of 6 is acceptable, and one with a rating of 4 is rejected. Separate criteria for recession may be also established so that any component with a recession value of 5 or better is acceptable, meaning that it is not receded from the disk surface too much. Components which are receded may have values of 4 or less as their recession distance increases. A prior art binning system may look at each of these factors and assign a "go, no-go" evaluation based on each of these independent parameters.

However, there will exist some components in which there is a compensation effect in these two factors that can be considered. For example, a component may have an unacceptable "recession value" of 4, but have an "amplitude value" of 7, meaning that the head recession places it farther away than is desirable, but the amplitude of signal generated may be large enough compensate for this, so that, although the magnetic field that drives the head may be attenuated by too great a distance between the sensor and the media, the signal that it produces is large enough that the end result will be acceptable. A system that rejects this component on the basis of the single "recession value" will be wasting a component that in practice may function perfectly.

In the current manufacturing process, there may be 28 or more such parameters to take into account. It can easily be seen that if each component is assigned a pass-fail judgment based on these parameters considered independently, many components will fail needlessly and yields will be lower than necessary.

Thus, it can be seen that needs exist for improved systems and methods for determining the reliability of electronic components which considers the interaction of multiple parameters and their interactive effect on overall reliability.

SUMMARY OF THE INVENTION

A method for improving yields in manufacturing processes is presented. The method includes identifying parameters which affect performance at a subsequent step in the process, collecting data concerning individual performance parameters, creating a reference scale which correlates individual parameters with performance at a subsequent step, testing a manufactured unit to collect performance data concerning two or more of the individual parameters from a manufactured unit, comparing performance data concerning two or more of the individual parameters from the manufactured unit to the reference scale to assign a probability of failure at a subsequent step for each of the single performance parameters, calculating a projectFRate value concerning multiple performance parameters from the yield loss figures for each of the single performance parameters, and utilizing the projectFRate value to sort units. It is possible that the projectFRate value can then be corrected to yield a calFRate, or used to produce a correlation of actual yield loss, or used directly as a Figure of Merit (FOM) for binning purposes. Once units are sorted and eventually installed or utilized, performance data can be gathered to make adjustments to the calFRate in an on-going effort to improve its accuracy.

It is an advantage of the present invention that the calFRate is very effective in improving the yield in units, compared to that caused by using single parameters in evaluating units.

It is a further advantage of the present invention that units are screened more accurately, thus resulting in less "overkill" and therefore less waste.

It is another advantage that there is no limit to the number of parameters that can be used.

It is yet another advantage of the present invention that various parameters are able to compensate for each other in the component, and the present invention allows for this compensation to provide improved yields over systems in which parts are screened on the basis of single parameters without regard to these compensation factors.

It is a further advantage that the present invention considers components on the basis of multiple parameters to make screening decisions, rather than having parts screened out in a defined linear sequence, therefore producing higher yields.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

Figure 5:
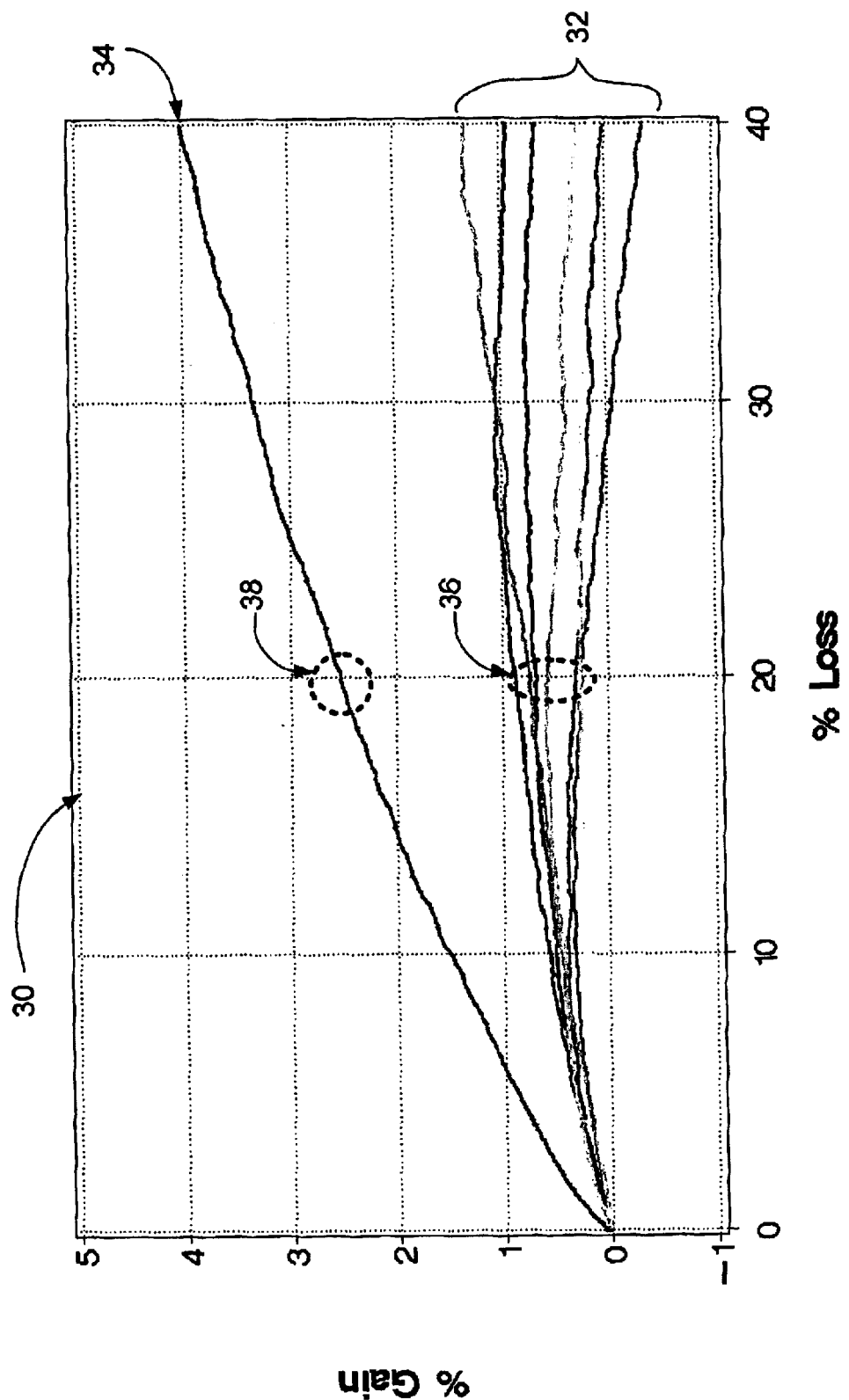
Figure 6:
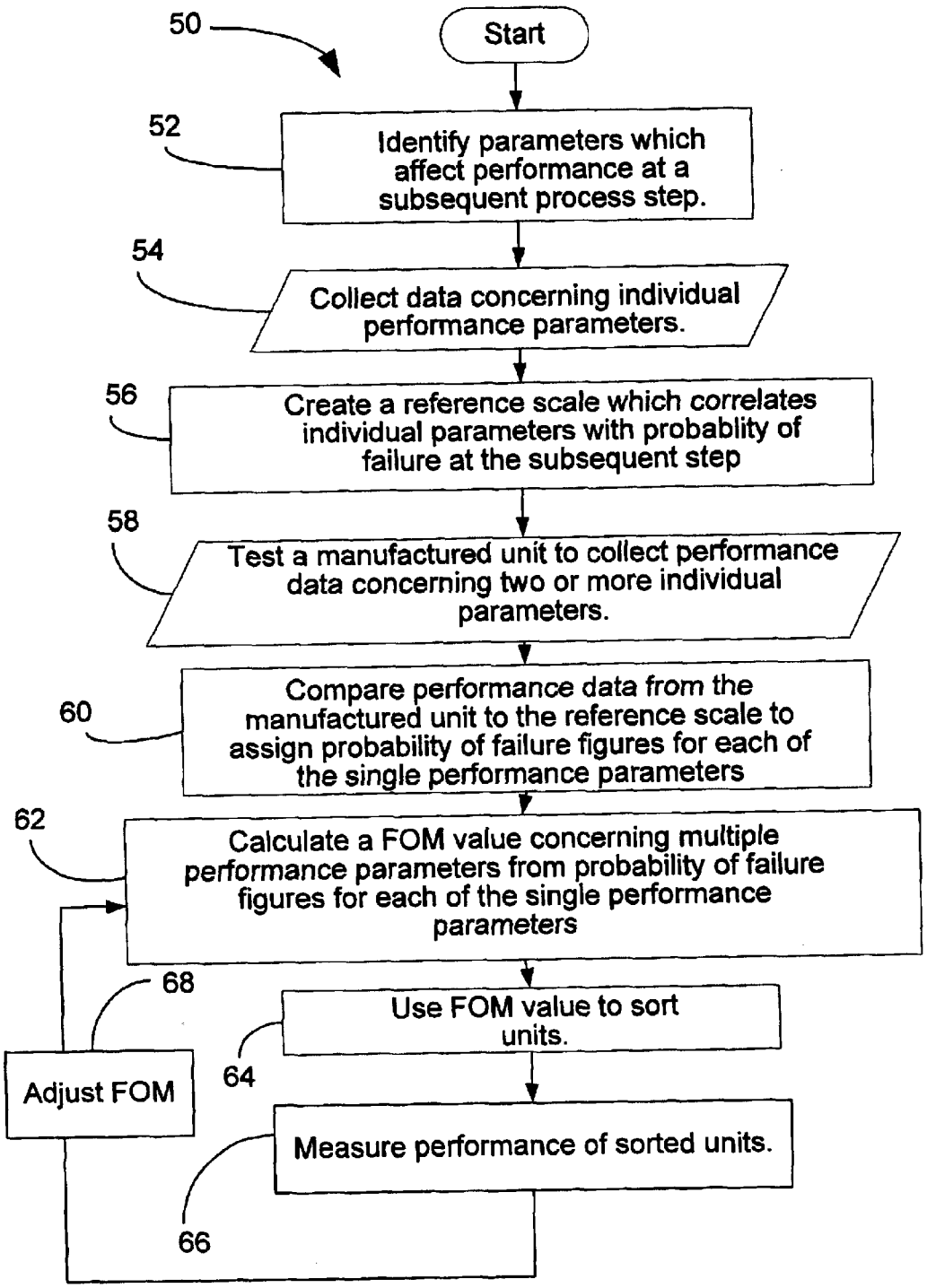

FIG. 5 is a graph of % Gain in HDD yield vs. % Loss in component yield comparing the percentage gain (% Gain) which is the improvement in yield in the larger assembly vs. the % Loss, which is the percentage of the population screened out produced by various single parameters used by the present invention, and then by the calFRate method; and FIG. 6 is a flowchart of the major stages involved in the method of the present invention.

DETAILED DESCRIPTION OF THE PREFERRED EMBODIMENTS

As discussed above, there are multiple factors that can be observed as the criteria for the evaluating the projected performance of electronic components, and the process can become very complex, with multiple parameters to be considered. As it is important that potentially defective components be screened out, it is also important that marginal components be evaluated in a manner which does not exclude too many which may in practice turn out to be acceptably reliable.

Returning to the example discussed above, a disk drive read head may have, among other qualities, the qualities of 1) amplitude, meaning the amplitude of the signal it is capable of producing in a uniform quasi-static magnetic field, and 2) recession, meaning the relative amount of distance that the head is positioned relative to the data medium that it is reading. Separate criteria for amplitude and recession may be established so that any component with a parameter value of 5 or better is acceptable, while components with a lesser value are rejected. However, there will exist some components in which there is a compensation effect in these two factors that can be considered. For example, a component may have an unacceptable "recession value" of 4, but have an "amplitude value" of 7, meaning that the head recession places it farther away than is desirable, but the amplitude of signal generated may be large enough compensate for this, so that, although the magnetic field that drives the head may be attenuated by too great a distance between the sensor and the media, the signal that it produces is large enough that the end result will be acceptable. A system that rejects this component on the basis of the single "recession value" will be wasting a component that in practice may function perfectly.

In the current manufacturing process, there may be 28 or more such parameters to take into account. It can easily be seen that if each component is assigned a pass-fail judgment based on these parameters considered independently, many components will fail needlessly and yields will be lower than necessary.

The present invention presents a method for considering and assigning values to multiple parameters and considering them in combination to produce improved yields and improved quality of components.

Taking again as an example a Hard Disk Drive (HDD) having a particular model of read head, it will again be assumed that amplitude and recession are two parameters of interest. Advances in parts tracking and data acquisition have now made it possible to track individual components such as read heads through testing cycles both at component level and in the assembled HDD. For each head, its performance in the HDD and whether the HDD passes or fails its own testing is known. Thus, combining the results of component-level and HDD-level testing, it is possible to assign each head a calculated failure rate assessment, or probability of the component failing in the HDD. In the discussion below, likelihood of failure will be discussed in terms of Probability of Failure of the HDD assembly, which is other way of saying the HDD yield loss per head.

Given an HDD model, for a single parameter $x_i$, the known probability of failure is $f(x_i)$ based on actual HDD failure sensitivity to the parameter.

When considering multi-parameters, i=1, 2, . . . , Np, the "projected failure rate" (projFRate) is defined as:

$$\text{projFRate} = 1 - \{[1-f(x1)]*[1-f(x2)]* \ldots *[1-f(xNp)]\}/Np$$

Figure 1:
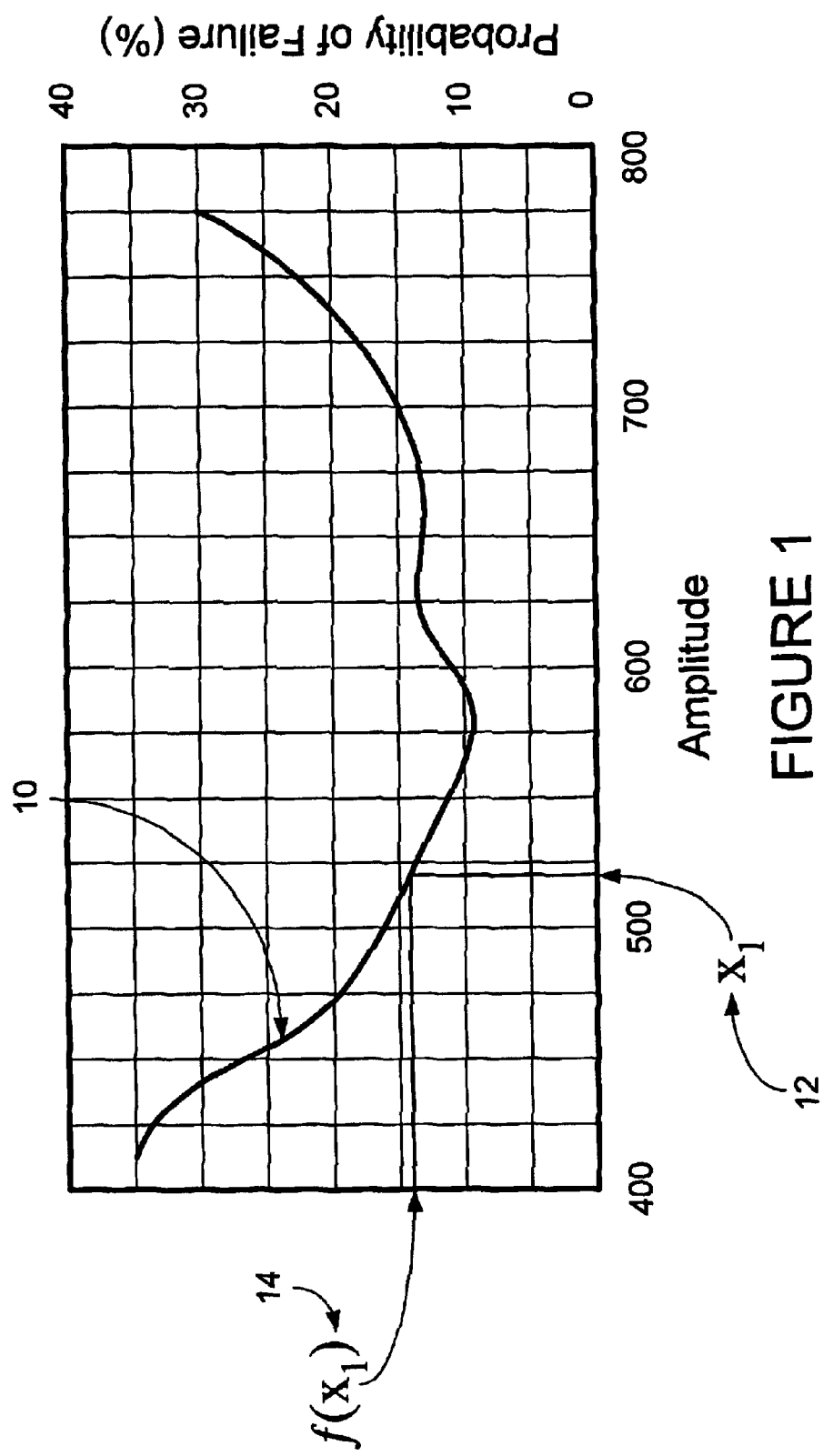
FIG. 1 is a graph of Probability of Failure of the HDD Assembly vs. Amplitude, as an example of a single performance parameter used in the calculation by the present invention.
Figure 2:
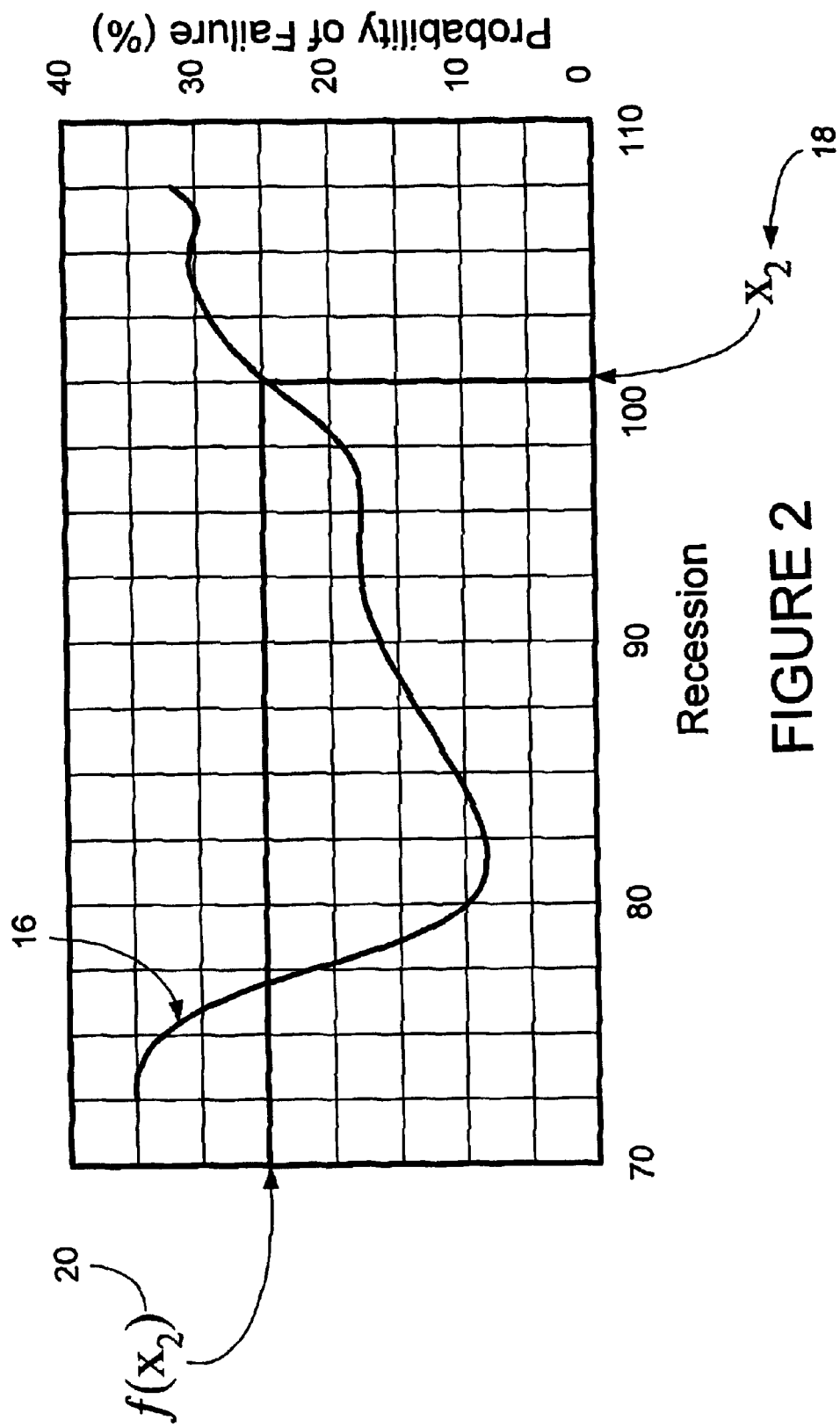
FIG. 2 is a graph of Probability of Failure of the HDD Assembly vs. Recession, as an example of another single performance parameter used in the calculation by the present invention.

Returning to our example, and considering FIGS. 1 and 2, FIG. 1 shows a graph of data gathered from testing previous batches of HDD read heads of a certain model. This data concerns the single parameter of amplitude and shows the corresponding probability of HDD failure for the range of amplitudes. This data has been compiled and graphed into a curve representing Probability of Failure vs. Amplitude 10. It is expected that components outside of a certain range will be unacceptable on either end of the range, so that for example heads with amplitude below 450 and above 750 will be routinely discarded. It should be noted that the units here are arbitrary and do not correlate to any particular units or experimental data actually recorded. They are used for the sake of illustration only.

A particular head is now fabricated, which in this case is assumed to have tested to have an amplitude of approximately 520 units. Referring to the chart of data in FIG. 1, an HDD built with this head will be expected to have a corresponding probability of failure in its testing of approximately 14%. Thus, $x_1$ 12 in this example will equal 520 and $f(x_1)$ 14=14%.

Turning to FIG. 2, a graph has been compiled of the expected failure rate vs. the parameter of "recession" to yield the curve of Probability of Failure vs. Recession 16. Again, the read head is tested, and yields a recession value, in this case measuring approximately 100 units (once again units are arbitrary) and a corresponding probability of failure in HDD testing of approximately 25%. Thus, $x_2$ 18=100 and $f(x_2)$ 20=0.25.

Assuming for this example that there are only these two parameters of interest, using the formula yields:

$$projFRate = 1 - \{[1 - .14] * [1 - .25]\} ** (1/2)$$
$$= 1 - \{[.86] * [.75]\} ** (1/2)$$
$$= 1 - \{.645\} ** (1/2)$$
$$= 1 - .80 = .20 = 20\%$$

This same method is used for whatever parameters of interest there may be. In this case, it is estimated that there may be 28 different factors so far which have been identified. In like fashion, for a single head, each of these parameters will be measured, and an associated probability of HDD test failure determined from compilations of data. These 28 factors are multiplied together and then the $28^{th}$ root taken to give an overall projected failure rate number.

The components can then be "binned" accordingly.

Figure 3:
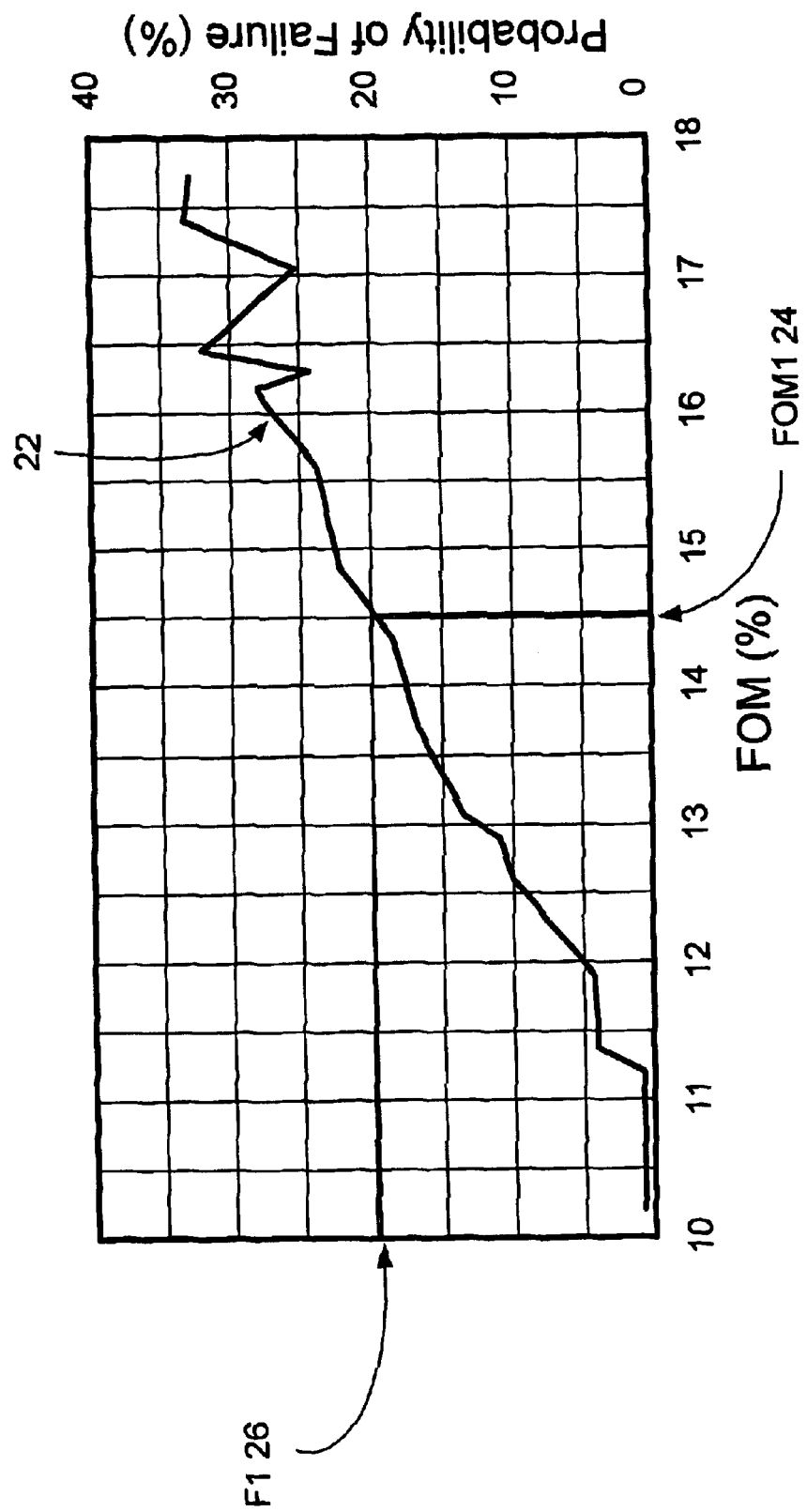
FIG. 3 is a graph of Probability of Failure of the HDD Assembly vs. the projectFRate Figure of Merit, used by the present invention.

This projFRate may not correspond to an actual failure rate, and may be considered more as a Figure of Merit (FOM) than a literal percentage, and will be referred to as such in the following discussion. As shown in FIG. 3, the corresponding probability of HDD test failure for a FOM of 0.13 corresponds well to a 12–13% HDD test failure rate, but in other areas, such as FOM of 0.15, there is a corresponding HDD test failure rate of 23%, and at FOM of 0.17, the curve becomes unstable due to the decreased population of data available near the extremes. This curve of HDD probable test failure rate vs. Figure of Merit (FOM) 22 is shown with the example FOM1 24 of 0.145 corresponding to a Probability of Failure F1 26 of approximately 20%. The instability at both ends of the curve are apparently at the flattened portion below FOM=0.11 and above FOM=0.16.

Figure 4:
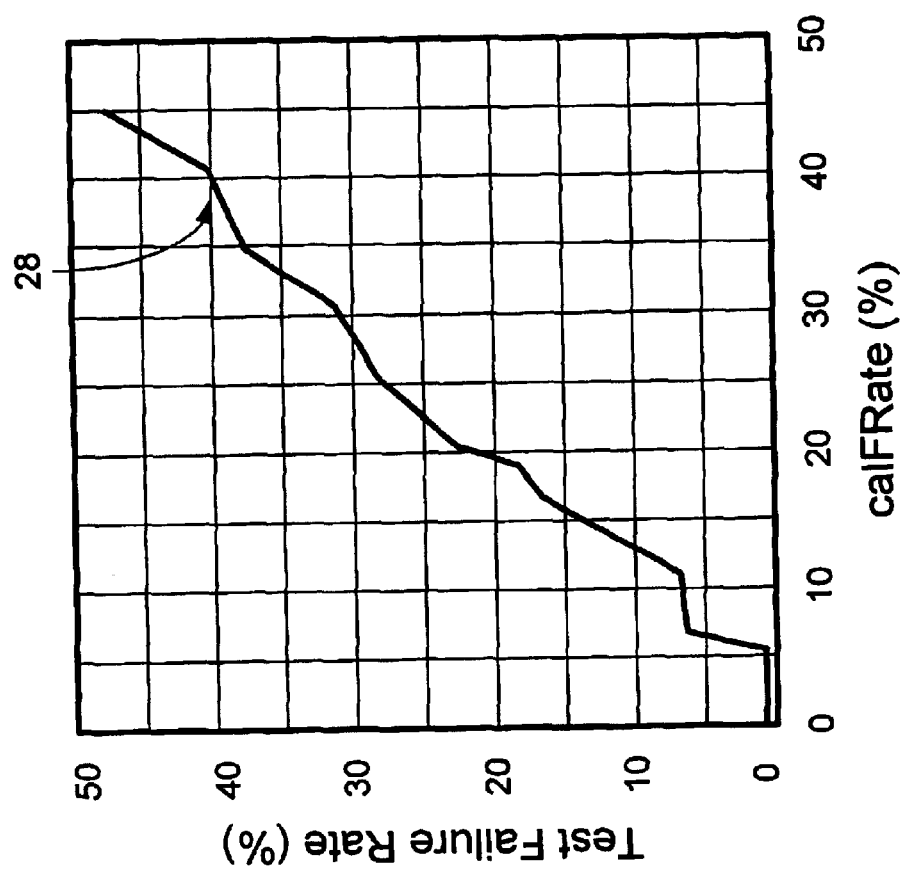
FIG. 4 is a graph of Probability of Failure of the HDD Assembly vs. the calFRate of the present invention.

The actual sensitivity curve for the projFRate FOM is then smoothed and adjusted so that the scales on both axes correlate better. This produces the Calculated Failure Rate or calFRate curve 28 which is shown in FIG. 4. It can be seen that the correlation between the calFRate and the HDD test failure rate is much closer after these adjustments.

The calFRate is very effective in improving the yield in disk drives, compared to that caused by using single parameters in evaluating components. FIG. 5 shows a graph 30 of % Gain which is the improvement in HDD test yield vs. the % Loss, which is the percentage of the population screened out. Eight curves are drawn, seven of which are based on single parameters 32 such as amplitude, asymmetry, and recession, and the eighth, at the top, is the calFRate 34. The exact values of these are not important for this discussion, but it is obvious that there is a great improvement in % Gain when using the calFRate. For example, if 20% of the components are screened out due to any one of the single parameters, the % Gain or improvement in HDD test yield is less than 1%, as shown by the dashed oval 36 on the graph. In contrast, the % Gain when using the calFRate is around 2.5% for a 20% Loss figure, as indicated by the dashed circle 38.

It should be noted that the projectFRate, calFRate, or any other function of $[1-f(x1)]*[1-f(x2)]* \ldots *[1-f(xNp)]$, can all be generally referred to Figures of Merit, which is generally any assigned value that can be used to sort or bin items.

The preceding discussion has emphasized evaluation of binning single components, but the same method may be used in evaluation of assemblies of components. Generally, the assemblies can be tested on a variety of parameters, data gathered and graphed. The parameters of interest can be tested for an assembly, say a disk drive, the probability of failure at a subsequent step (e.g., field failure rate or burn-in test failure rate) assigned for each of these parameters, and a calFRate calculated for the multiple parameters involved in the assembly. And, as will be obvious to one skilled in the art, this can then be expanded in scope to cover entire devices, which are composed of assemblies. For purposes of this patent application, "units" will be used as an overall term which can mean components, assemblies or devices which are produced by a manufacturing process.

FIG. 6 shows a flow chart 50 of the method for improving yields of manufactured units of the present invention. First, parameters are identified which affect performance at a subsequent step in the process 52. Then data is collected concerning individual performance parameters 54. Next, a reference scale is created which correlates the individual parameters with probability of failure at a subsequent step in the process 56. A manufactured unit is then tested to collect performance data concerning two or more of the individual parameters from this manufactured unit 58. Performance data concerning two or more of the individual parameters ($x_i$, in the preceding discussion) from the manufactured unit is compared to the reference scales created in 56 to assign probability of failure ($f(x_i)$ in the preceding discussion) for each of the single performance parameters 60. A Figure of Merit, preferably a projectFRate value, is calculated concerning multiple performance parameters from the probability of failure for each of the single performance parameters 62. This is done by using the formula discussed previously, namely:

$$projFRate=1-\{[1-f(x1)]*[1-f(x2)]* \ldots *[1-f(xNp)]\}/Np).$$

This projectFRate value can then be used directly to sort units 64, the projectFRate acting as a figure of merit (FOM) which does not exactly correlate to a yield loss percentage, as discussed above.

The sorted units may then be assigned to assemblies or devices based on their combination of individual qualities, so that this method has also been referred to as "combination binning" since bin assignment is determined by a combination of factors rather than by individual parameters.

The performance of the units in their next higher assembly or as completed devices can then be measured. This FOM or projectFRate can optionally be refined by measuring the performance of the sorted units 66 and using this data to adjust the FOM or projectFRate 68. In this case the formula above may be adjusted by adding or subtracting some factor, or multiplying by a compensation factor to produce more accurate results. This process can be repeated until further iterations yield insignificant improvement.

Also optionally, this projectFRate Figure of Merit can be used in other ways to produce other figures of merit or expected probabilities of failure. The projectFRate can then be correlated with a probability of failure so that, as in the example discussed above, a FOM of 14.5 yields a corresponding probability of failure of 20%. This percentage figure can then be used to sort the units.

Alternately, the projectFRate can be adjusted to produce a calFRate, with associated percentage, which can once again be used for sorting units.

In both cases, in a similar manner to that used in refining the projectFRate, the performance of the sorted units can again be measured and this data used to adjust the probability of failure and calFRate respectively.

The requirements for application of the method include that data is available for parameters involved in the component, as well as for performance of the component at a subsequent step in the process, and the data used to generate probability of failure at a subsequent step or some such reference scale, for the component assembly or device. The system must have adequate traceability of parts, such that the data on these parameters can be associated with the individual component, assembly or device, and this data must then be retrievable and able to be compared with the reference scale and a probability of failure as a function of an individual parameter be assigned. The individual parameter failure rate values are inserted into the multi-parameter projected failure rate equation to yield a projFRate Figure of Merit. This can then be corrected to yield a calFRate, or used to produce a correlation of actual failure rate, or used directly as a FOM for binning purposes. The inventors estimate that using a binning system based on this method, in the disk drive head industry, HDD yield gains of 0.9–2.1% per head can be produced with no additional component-level yield loss. If used with techniques to optimize specifications, the improvement can be even higher.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for improving yields in manufacturing processes, comprising:
   A) identifying parameters which affect performance at a subsequent step in the process;
   B) collecting data concerning individual performance parameters;
   C) creating a reference scale which correlates individual parameters with probability of failure at said subsequent step in the process;
   D) testing a manufactured unit to collect performance data concerning two or more of said individual parameters from the manufactured unit;
   E) comparing performance data concerning two or more of said individual parameters from said manufactured unit to said reference scale to assign probability of failure at said subsequent step for each of said single performance parameters;
   F) calculating a Figure of Merit value concerning multiple performance parameters from said probabilities of failure for each of said single performance parameters; and
   G) utilizing said Figure of Merit value to sort units.

2. The method of claim 1, wherein:
said units are components.

3. The method of claim 2, wherein:
said subsequent step in the process is assembly manufacturing test.

4. The method of claim 1, wherein:
said units are assemblies.

5. The method of claim 4, wherein:
said probability of failure at said subsequent step in the process is field rate.

6. The method of claim 1, wherein:
said units are devices.

7. The method of claim 4, wherein:
said subsequent step in the process is burn-in test.

8. The method of claim 1, wherein:
said Figure of Merit is projectFRate.

9. The method of claim 8, wherein:
said projectFRate value is calculated from the formula $$\text{projFRate}=1-\{[1-f(x1)]*[1-f(x2)]* \ldots *[1-f(xNp)]\}**(1/Np).$$

10. The method of claim 1, wherein:
said Figure of Merit is any function of $[1-f(x1)]*[1-f(x2)]* \ldots * [1-f(xNp)]$.

11. The method of claim 1, wherein:
said Figure of Merit value is correlated with a probability of failure value, which is then used to sort units.

12. The method of claim 1, wherein:
said Figure of Merit value is adjusted to produce a Calculated Failure Rate value, which is then used to sort units.

13. The method of claim 1, further comprising:
H) measuring performance of sorted units; and
I) adjusting said Figure of Merit.

14. A method for improving yields in magnetic heads for use in manufacturing computer hard disk drives, comprising:
   A) identifying parameters of the heads which affect hard disk drive manufacturing yields;
   B) collecting data concerning individual performance parameters;
   C) creating a reference scale which correlates individual parameters with probability of failure in hard disk drive;
   D) testing a manufactured head to collect performance data concerning two or more of said individual parameters from a manufactured unit;
   E) comparing performance data concerning two or more of said individual parameters from said manufactured head to said reference scale to assign probability of failure at HDD test, for each of said single performance parameters;
   F) calculating a Figure of Merit value concerning multiple performance parameters from said probability of failure for each of said single performance parameters; and
   G) utilizing said Figure of Merit value to sort heads.

15. The method of claim 14, wherein:
said Figure of Merit is used to sort into groups of passing (shipped) and failing (scrapped) heads.

16. The method of claim 14, wherein:

said Figure of Merit is used to sort heads for use in specific hard disk drive model where their hard disk yield is relatively higher.

17. The method of claim 14, further comprising:

H) measuring performance of sorted units; and

I) adjusting said Figure of Merit.

18. The method of claim 14, wherein:

said Figure of Merit is projectFRate.

19. The method of claim 18, wherein:

said projectFRate value is calculated from the formula $$\text{projFRate} = 1 - \{[1-f(x1)]*[1-f(x2)]* \ldots *[1-f(xNp)]\}**(1/Np).$$

20. The method of claim 14, wherein:

said Figure of Merit value is correlated with probability of failure, which is then used to sort units.

21. The method of claim 14, wherein:

said Figure of Merit value is adjusted to produce a Calculated Failure Rate value, which is then used to sort units.

22. The method of claim 14, wherein:

said parameters are chosen from a group consisting of amplitude, recession, magnetic spacing, magnetic stability, pole tip geometry and electrical resistance.

* * * * *